United States Patent
Rayner et al.

(10) Patent No.: US 9,968,115 B2
(45) Date of Patent: May 15, 2018

(54) PSEUDO-LOAF FOOD COMPOSITIONS

(71) Applicant: Nestec SA, Vevey (CH)

(72) Inventors: Michael G Rayner, St. Joseph, MO (US); Jean Luz Rayner, St. Joseph, MO (US); Rachel Miller, St. Louis, MO (US)

(73) Assignee: NESTEC SA, Vevey (CH)

( * ) Notice: Subject to any disclaimer, the term of this patent is extended or adjusted under 35 U.S.C. 154(b) by 396 days.

(21) Appl. No.: 14/087,893

(22) Filed: Nov. 22, 2013

(65) Prior Publication Data

US 2014/0154390 A1 Jun. 5, 2014

Related U.S. Application Data

(60) Provisional application No. 61/733,079, filed on Dec. 4, 2012.

(51) Int. Cl.
| | | |
|---|---|---|
| *A23K 1/18* | (2006.01) | |
| *A23K 10/20* | (2016.01) | |
| *A23K 50/48* | (2016.01) | |
| *A23L 13/00* | (2016.01) | |
| *A23L 13/60* | (2016.01) | |

(52) U.S. Cl.
CPC ............. *A23K 1/1866* (2013.01); *A23K 10/20* (2016.05); *A23K 50/48* (2016.05); *A23L 13/06* (2016.08); *A23L 13/67* (2016.08)

(58) Field of Classification Search
CPC ...... A23L 1/3106; A23L 1/3177; A23L 13/67; A23L 13/06; A23K 1/1866; A23K 1/10; A23K 10/20; A23K 50/48
See application file for complete search history.

(56) References Cited

U.S. PATENT DOCUMENTS

| | | | |
|---|---|---|---|
| 3,965,259 A | 6/1976 | Coppage et al. | |
| 4,781,939 A * | 11/1988 | Martin | A23L 13/67 426/513 |
| 4,784,860 A * | 11/1988 | Christensen | C12Y 302/00 426/46 |
| 5,792,504 A * | 8/1998 | Poppel | A23J 3/227 426/646 |
| 6,280,779 B1 * | 8/2001 | Nadeau | A23K 50/48 426/2 |
| 6,379,738 B1 | 4/2002 | Dingman et al. | |
| 6,410,079 B2 | 6/2002 | Cheuk et al. | |
| 6,436,463 B1 | 8/2002 | Cheuk et al. | |
| 6,440,485 B1 | 8/2002 | Cheuk et al. | |
| 6,582,740 B1 | 6/2003 | May et al. | |
| 6,692,787 B2 | 2/2004 | May et al. | |
| 6,911,224 B1 * | 6/2005 | May | A23K 10/20 426/106 |
| 7,736,686 B2 | 6/2010 | Dingman et al. | |
| 2002/0090432 A1 | 7/2002 | May et al. | |
| 2003/0039738 A1 * | 2/2003 | Cheuk | A23K 40/00 426/641 |
| 2006/0141125 A1 | 6/2006 | Gifford | |
| 2007/0148323 A1 * | 6/2007 | Dingman | A23K 10/20 426/646 |
| 2008/0152774 A1 * | 6/2008 | Fernandes | A23K 1/10 426/574 |
| 2008/0268093 A1 * | 10/2008 | Bowman | A23K 1/10 426/2 |
| 2009/0214738 A1 | 8/2009 | Dieking et al. | |
| 2012/0171336 A1 * | 7/2012 | Dixon | A23K 1/10 426/92 |
| 2014/0010916 A1 * | 1/2014 | Pibarot | A23K 1/10 426/19 |
| 2014/0242228 A1 * | 8/2014 | Nadeau | A23K 1/1603 426/311 |

FOREIGN PATENT DOCUMENTS

| | | |
|---|---|---|
| CN | 101132702 | 2/2008 |
| CN | 101524121 | 9/2009 |
| CN | 101562985 | 10/2009 |
| WO | 199805219 A1 | 2/1998 |
| WO | 2003026436 A1 | 4/2003 |
| WO | 2008085293 | 7/2008 |
| WO | 2012057826 | 5/2012 |

OTHER PUBLICATIONS

Dzanis, J. Nutr., 124: 2535S-2539S, 1994.*
"AAFCO Statements explained-lams", dated Feb. 1001,4 pages.*
International Search Report and Written Opinion for PCT/US2013/071457 dated Feb. 20, 2014.

* cited by examiner

*Primary Examiner* — Chhaya Sayala

(57) ABSTRACT

The invention provides pseudo-loaf food compositions comprising meat analog chunks and gravy, the gravy comprising a thickener selected from the group consisting of a gum present in the gravy in an amount from about 0.5 to about 3.0% of the gravy by weight, a starch present in the gravy in an amount from about 2.0 to about 9.0% of the gravy by weight, and combinations thereof. The food composition has a moisture content from about 60% to about 74% of the composition by weight and has a loaf-type structure. In an embodiment, the moisture content of the pseudo-loaf food composition is from about 67% to about 74% of the composition by weight. In addition, the invention provides methods of making pseudo-loaf food compositions and also provides blended food compositions comprising one or more pseudo-loaf compositions and one or more comestible ingredients compatible with the pseudo-loaf food compositions.

5 Claims, 3 Drawing Sheets

PSEUDO-LOAF FOOD COMPOSITIONS

CROSS REFERENCE TO RELATED APPLICATIONS

This application claims priority to U.S. Provisional Application No. 61/733,079 filed Dec. 4, 2012, the disclosure of which is incorporated herein by this reference.

BACKGROUND OF THE INVENTION

Field of the Invention

The invention relates generally to food compositions and particularly to pseudo-loaf food compositions.

Description of Related Art

Conventional loaf-type food products are typically coagulated emulsions sold in containers bearing the shape of the loaf-type food products. Loaf-type food products are commonly used as pet foods because they are easily manufactured, readily digested by the animals, very palatable to the animals, and readily formulated to contain necessary nutrients and trace elements. A disadvantage is that these coagulated emulsions do not have a striated and chunky meat-like appearance and friable texture. However, for pet foods, a meat-like appearance and texture can greatly enhance consumer acceptability. Moreover, meat analog chunks formed by slicing a solid emulsion product into pieces can have a chewy texture which requires the animals to chew them and thereby provide the advantage of being beneficial to the animals' teeth, and this texture is lacking in known loaf-type food products.

There is, therefore, a need for new pseudo-loaf food compositions that have the appearance of loaf-type food compositions but have the eating characteristics of chunk-in-gravy food compositions.

SUMMARY OF THE INVENTION

It is, therefore, an object of the invention to provide new pseudo-loaf food compositions.

It is another object of the invention to provide new methods for making new pseudo-loaf food compositions.

It is a further object of the invention to provide blended food compositions comprising pseudo-loaf food compositions and one or more other comestible ingredients.

One or more of these or other objects are achieved using novel pseudo-loaf food compositions comprising meat analog chunks and gravy, the gravy comprising a thickener selected from the group consisting of a gum present in the gravy in an amount from about 0.5 to about 3.0% of the gravy by weight, a starch present in the gravy in an amount from about 2.0 to about 9.0% of the gravy by weight, and combinations thereof; the food composition having a moisture content from about 60% to about 74% of the composition by weight and having a loaf-type structure.

The novel pseudo-loaf food compositions can be made by forming meat analog chunks from a solidified emulsion; and mixing the meat analog chunks with gravy comprising a thickener selected from the group consisting of a gum present in the gravy in an amount from about 0.5 to about 3.0% of the gravy by weight a starch present in the gravy in an amount from about 2.0 to about 9.0% of the gravy by weight, and combinations thereof, to form the pseudo-loaf food composition; the pseudo-loaf food composition having a moisture content from about 60% to about 74% of the composition by weight and having a loaf-type structure.

The pseudo-loaf food compositions can be mixed or otherwise combined with one or more comestible ingredients to produce blended food compositions.

Other and further objects, features, and advantages of the present invention will be readily apparent to those skilled in the art.

DETAILED DESCRIPTION OF THE INVENTION

Definitions

Figure 1:
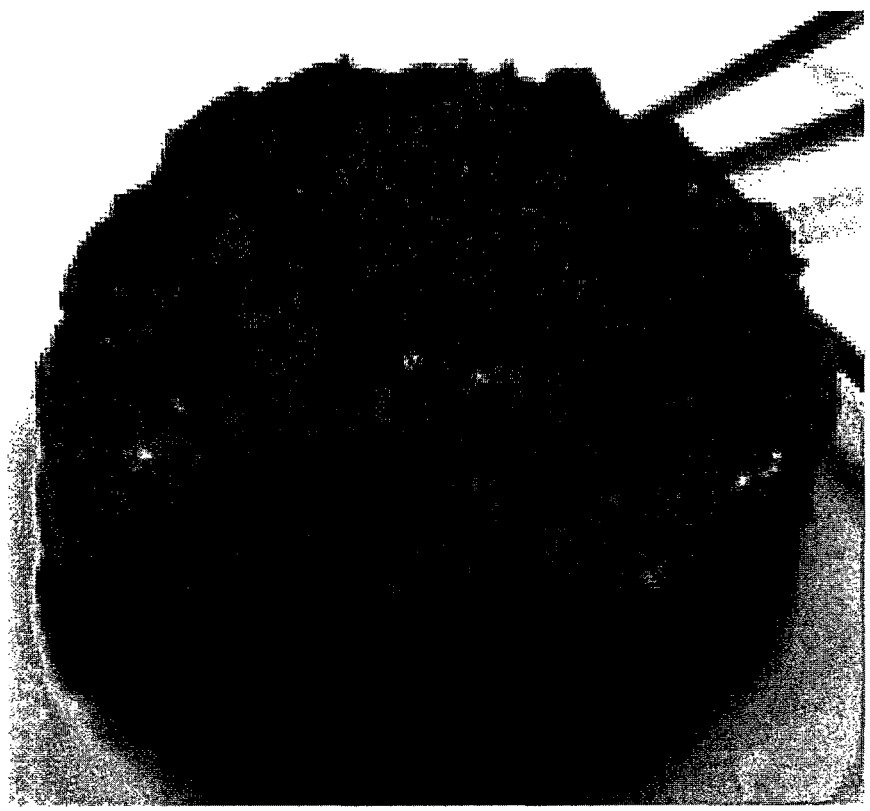
FIG. 1 is a photograph of a pseudo-loaf food composition in a first embodiment.

The term "food composition" means a product or composition that is intended for ingestion by an animal.

The term "pseudo-loaf food composition" means a food composition that has the appearance of a loaf-type food composition but has the eating characteristics of a chunk in gravy food composition. The terms "loaf-type food composition" and "loaf-type structure" mean a shaped or molded mass of a food product. For example, the loaf-type food product can be a shaped or molded mass of an animal food product such as an emulsified meat product. The term "meat analog chunks" means a plurality of separate food bodies.

The term "animal" means any animal that could benefit from or enjoy the consumption of the food compositions of the present invention, including human, avian, bovine, canine, equine, feline, hicrine, lupine, murine, ovine, or porcine animals.

The term "companion animal" means domesticated animals such as cats, dogs, rabbits, guinea pigs, ferrets, hamsters, mice, gerbils, horses, cows, goats, sheep, donkeys, pigs, and the like.

All percentages expressed herein are by weight of the total weight of the composition unless expressed otherwise.

Ranges are used herein as shorthand to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a supplement", "a method", or "a food" includes a plurality of such "supplements", "methods", or "foods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The methods and compositions and other advances disclosed herein are not limited to particular methodologies, protocols, and reagents because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides pseudo-loaf food compositions. The compositions can comprise meat analog chunks and gravy in a loaf-type structure that maintains a shape. The loaf-type structure can hold the meat analog chunks and the gravy together at ambient temperature and ambient pressure. For example, the meat analog chunks and the gravy can be held together in the pseudo-loaf food composition such that the composition has substantially no free meat analog chunks or gravy separate from the loaf-type structure. In an embodiment, the pseudo-loaf food composition is friable such that the composition is easily broken apart and readily consumed by the animal. In a preferred embodiment, the pseudo-loaf food compositions are designed for canned pet food. However, embodiments of the present invention can provide pseudo-loaf food compositions for human consumption.

In a preferred embodiment, the meat analog chunks can be irregularly sized such that the meat analog chunks comprise meat analog chunks of different shapes and/or different sizes. In an embodiment, the meat analog chunks are present in an amount from about 40 to about 50% of the pseudo-loaf food composition by weight, and the gravy is present in an amount from about 40 to about 50% of the pseudo-loaf food composition by weight.

The meat analog chunks can be approximately evenly distributed throughout the pseudo-loaf food composition, and the gravy can be approximately evenly distributed throughout the pseudo-loaf food composition. For example, the pseudo-loaf food composition can be substantially uniform such that similarly sized sections of the composition have substantially the same amount of the meat analog chunks by weight and/or substantially the same amount of the gravy by weight. The meat analog chunks and gravy can be present throughout the pseudo-loaf food composition. For example, the pseudo-loaf food composition preferably does not have visible layers.

In an embodiment, the pseudo-loaf food composition only comprises the meat analog chunks and the gravy. Alternatively, the pseudo-loaf food composition can comprise other ingredients in addition to the meat analog chunks and the gravy. For example, the pseudo-loaf food compositions can also comprise visible nutrition ingredients that can be in the form of pieces on the surfaces of and/or within the composition. Suitable visible nutrition ingredients include corn germ meal, dehydrated vegetables, fruits and grains. For example, the visible nutrition ingredients can be spinach, carrots, cranberries or combinations thereof.

The pseudo-loaf food compositions can have a moisture content from about 60% to about 74% of the composition by weight. In a preferred embodiment, the moisture content is from about 67% to about 74% of the composition by weight.

In addition to the meat analog chunks and the gravy, the pseudo-loaf food compositions can comprise any suitable grain that adds a pleasant taste and consistency to the composition. Grains can be added at concentrations up to about 5% and more preferably about 1.5% of the pseudo-loaf food composition by weight. Suitable grains include, for example, powdered barley, barley, rice, wild rice, brown rice, oats and millet. Barley and wild rice are generally added to pseudo-loaf food compositions in dry form, whereas rice is generally precooked.

In addition to the meat analog chunks and the gravy, the pseudo-loaf food compositions can comprise vegetables providing at least one of nutrition, color or aesthetic appearance to the composition. Suitable vegetables include, for example, potatoes, squash, zucchini, spinach, radishes, asparagus, tomatoes, cabbage, peas, carrots, spinach, corn, green beans, lima beans, broccoli, brussel sprouts, cauliflower, celery, cucumbers, turnips, yams and combinations thereof. Vegetables can be added to the meat analog chunks and/or the gravy in any suitable form including fresh, dried, freeze dried or frozen form. In compositions that contain green beans and corn, these ingredients are generally added in frozen form.

In addition to the meat analog chunks and the gravy, the pseudo-loaf food compositions can comprise a vegetable oil, a pasta and/or a cheese. Suitable vegetable oils include soybean oil, corn oil, cottonseed oil, sunflower oil, canola oil, peanut oil, safflower oil, and the like. Examples of suitable pastas include rotini, macaroni, bow tie pasta, macaroni, fuisilli, tortellini, penne or other pasta types. The vegetables, the grains, the vegetable oil, the pasta and/or the cheese, if any, can be added to the pseudo-loaf food compositions prior to canning.

The shape of the pseudo-loaf food composition can be any suitable shape such as a cube, a cylinder and the like. In an embodiment, the pseudo-loaf food composition is deposited and stored in a container, and the shape of the interior of the container is imparted on the pseudo-loaf composition.

The meat analog chunks in the pseudo-loaf food composition can be in the form of a meat emulsion that is sliced into separate pieces. Non-limiting examples of meat emulsions for use in the meat analog chunks of the compositions are disclosed in U.S. Pat. Nos. 7,736,686; 6,692,787; 6,379,738; 4,781,939, PCT Applications WO 2008085293 A2, and WO 2012057826 A1 herein incorporated by reference in their entireties. In some embodiments, the meat analog chunks in the pseudo-loaf food composition can comprise a meat, such as skeletal tissue and non-skeletal muscle from mammals, fowl and fish, and/or meat by-products, such as non-rendered clean parts, other than meat, derived from slaughtered mammals, fowl, or fish. Thus, the term "meat"

as used herein refers to non-dehydrated meat and/or meat by-products, including frozen materials.

Non-limiting examples of suitable meats include poultry, beef, pork, lamb and fish, especially those types of meats suitable for pets. If the pseudo-loaf food composition is intended for human consumption, any of the meats and meat by-products used in the production of conventional meat emulsions may be used, including meats such as whole-carcass beef and mutton; lean pork trim; beef shanks; veal; beef and pork cheek meat; and meat by-products such as lips, tripe, hearts, and tongues. If the product is intended for use as a pet food product, the meat mix may contain, in addition to the examples described above, any of the meat by-products approved for use in animal foods, such as mechanically deboned beef, chicken or fish; beef and pork liver; lungs; kidney; and the like. In an embodiment, the meat is a combination of different types of meats. The invention is not limited to a specific meat or combination of meats, and any meat known to the skilled artisan for making a food composition can be used.

The meat analog chunks can comprise other ingredients in addition to the meat. For example, additives used in conventional meat emulsion products may be included in the meat analog chunks by being mixed with the meat prior to and/or after emulsification. These additives include salt, spices, seasoning, sugar and the like in amounts sufficient to provide the product with desired taste characteristics.

One or more dry proteinaceous materials can be added to the meat prior to and/or after emulsification to improve emulsion stability and binding, impart flavor, and/or reduce formulation costs. Non-limiting examples of suitable dry proteinaceous materials are wheat gluten, soy flour, soy protein concentrate, soy protein isolate, egg albumin, nonfat dry milk and combinations thereof. The inclusion of the one or more dry proteinaceous materials in the meat emulsion is particularly advantageous in the production of compositions intended for use as a pet food because dry proteinaceous material enables the processor to use meat having a protein to fat ratio and myosin to total protein ratio which would otherwise be of marginal acceptability for use in preparing the meat analog chunks.

The gravy in the pseudo-loaf food composition comprises water and a thickener that is at least one of a starch or a gum. If a gum is used, the gum can be present in an amount from about 0.5% to about 3.0% of the gravy, preferably from about 0.6% to about 2.5% of the gravy, and most preferably from about 0.7% to about 2% of the gravy by weight. If a starch is used, the starch can be present in an amount from about 2% to about 9% of the gravy, preferably from about 2.5% to about 7% of the gravy, and most preferably from about 3% to about 5% of the gravy by weight. Examples of suitable gums are gellan gum, xanthan gum, locust bean gum, pectin, carrageenan (e.g., kappa, iota and/or lambda), cellulose gum, gum Arabic and the like, and combinations thereof. Suitable starches include native starches, starch esters, starch ethers, and modified starches, such as starch modified with erythorbic acid, and combinations thereof. Starch sources can include wheat, barley, rice, tapioca, potato and corn, for example.

The gravy can also comprise dextrose and/or glycine and can also include a colorant as desired. Ingredients that add flavor and/or aroma to the gravy can also be included as desired. The starch can be a native starch, a modified starch or a combination thereof; and suitable gums include kappa-carrageenan, locust bean gum, guar gum and xanthan gum.

In various embodiments, the meat analog chunks and/or the gravy can comprise additional ingredients such as vitamins, minerals, amino acids, nucleic acids, fillers, palatability enhancers, binding agents, flavorants, stabilizers, emulsifiers, sweeteners, colorants, buffers, salts, coatings, condiments, preservatives, and the like known to skilled artisans. The additional ingredients may be included in the meat analog chunks by being mixed with the meat prior to and/or after emulsification.

Non-limiting examples of supplementary vitamins include vitamin A, any of the B vitamins, vitamin C, vitamin D, vitamin E, and vitamin K, including various salts, esters, or other derivatives of the foregoing. Non-limiting examples of minerals include calcium, phosphorous, potassium, sodium, iron, chloride, boron, copper, zinc, magnesium, manganese, iodine, selenium, and the like. Additional dietary supplements may also be included, for example, any form of niacin, pantothenic acid, inulin, folic acid, biotin, amino acids, and the like, as well as salts and derivatives thereof.

Stabilizers include substances that tend to increase the shelf life of the pseudo-loaf food composition such as preservatives, synergists and sequestrants, packaging gases, emulsifiers, thickeners, gelling agents, and plasticizers. Examples of emulsifiers and/or thickening agents include gelatin, cellulose ethers, starch, starch esters, starch ethers, and modified starches.

Examples of suitable flavorants include yeast, tallow, rendered animal meals (e.g., poultry, beef, lamb, pork), flavor extracts or blends (e.g., grilled beef), and the like. Suitable colorants that can be used in the meat analog chunks and/or the gravy include FD&C colors, such as blue no. 1, blue no. 2, green no. 3, red no. 3, red no. 40, yellow no. 5, yellow no. 6, and the like; natural colors, such as caramel coloring, annatto, chlorophyllin, cochineal, betanin, turmeric, saffron, paprika, lycopene, elderberry juice, pandan, butterfly pea and the like; titanium dioxide; iron oxides; and any suitable food colorant known to the skilled artisan. Suitable spices that can be used in the meat analog chunks and/or the gravy include parsley, oregano, sage, rosemary, basil, thyme, chives and the like.

Selection of the additional ingredients and their amounts is known to skilled artisans. Specific amounts for each additional ingredient will depend on a variety of factors such as the ingredient included in the composition; the species of animal; the animal's age, body weight, general health, sex, and diet; the animal's consumption rate; the purpose for which the food composition is being administered to the animal; and the like. Therefore, the component and ingredient amounts may vary widely and may deviate from the preferred proportions described herein.

The invention is based upon the discovery that the amount of the starch and/or gum in the gravy, as well as the moisture content of the pseudo-loaf food composition comprising the meat analog chunks and the gravy, can allow the food composition to have a loaf-type structure while having eating characteristics of a chunk-in-gravy composition.

As a result, an embodiment of the present invention provides a pseudo-loaf food composition comprising meat analog chunks and gravy. The gravy comprises a thickener selected from the group consisting of a gum present in the gravy in an amount from about 0.5 to about 3.0% of the gravy by weight, a starch present in the gravy in an amount from about 2.0 to about 9.0% of the gravy by weight, and combinations thereof. The food composition has a moisture content from about 60% to about 74% of the composition by weight and has a loaf-type structure.

The moisture content can be from about 67% to about 74% of the food composition by weight. The meat analog chunks can comprise meat and can be present in an amount from about 40% to about 50% of the food composition by weight. The gravy can be present in an amount from about 40% to about 50% of the food composition by weight. The food composition of can be formulated to provide complete and balanced nutrition for an animal, such as a companion animal that can be a dog or a cat.

When present, the gum can be in the gravy in an amount from about 0.7 to about 2.0% of the gravy by weight. When present, the starch can be in the gravy in an amount from about 3.0 to 5.0% of the gravy by weight. The food composition can further comprise at least one of a grain, a vegetable, vegetable oil, a pasta or a cheese. The loaf-type structure can be friable. In an embodiment, the starch is a starch modified with erythorbic acid, and/or the gum is xanthan gum.

In another aspect, the present invention provides methods for making pseudo-loaf food compositions. In an embodiment, the meat analog chunks can be produced by emulsifying one or more of meat, dry proteinaceous materials, water and any additional ingredients. In an embodiment, the emulsion comprises a flour such that the emulsion is a dough. Examples of suitable flours include wheat flour, amaranth flour, bean flour, white or brown rice flour, buckwheat flour, chestnut flour, chickpea flour, potato flour, corn flour, nut flour grated from oily nuts, pea flour, peanut flour, rye flour, tapioca flour, soy flour and the like. The invention is not limited to a specific flour, and any flour known to the skilled artisan for making a dough can be used.

The emulsion can be formed using equipment commonly used in meat emulsification such as a mixer, a blender, a grinder, a silent cutter chopper, an emulsion mill, and the like. The other ingredients of the meat analog chunks can be added to the meat prior to and/or after emulsification of the meat. The emulsion can be formulated to contain between about 45% to about 80% moisture by weight, with the moisture content preferably being controlled between about 49% to about 56% by weight of the emulsion.

The emulsion can then be run through a high speed emulsion mill in a second emulsion step in which the emulsion is thermally gelled by rapid heating. The heated emulsion can then be cooled. For example, the heated emulsion can be discharged form the mill into a heat exchanger to lower the temperature of the emulsion and to solidify the emulsion into a striated meat-like structure.

The striated meat-like structure can be sliced into pieces to create the meat analog chunks. For example, a dicer, a rotary cut-off knife, a water jet knife, a knife grid or the like may cut the product into pieces of desired sizes. In an embodiment, portions of the striated meat-like structure can be processed differently to create pieces of different sizes. For example, a portion of the striated meat-like structure can be sliced to create meat analog chunks having a longest side shorter than a first predetermined length, and another portion of the striated meat-like structure can be sliced to create different meat analog chunks having a longest side shorter than a second predetermined length. In such an embodiment, the larger meat analog chunks may assist the pseudo-loaf food composition in maintaining a shape by entrapping the smaller meat analog chunks within the composition.

In a preferred embodiment, the gravy is prepared separately from the meat analog chunks. For example, prior to mixing the gravy with the meat analog chunks, the gravy can be mixed by standard means well known in the art. In an embodiment, the gravy can be formed by adding the non-water components of the gravy to the water during continuous mixing, such as by a high speed mixer, and the gravy can be formed at ambient temperatures. In another embodiment, the gravy can be formed by mixing the non-water components of the gravy in a portion of the water at ambient temperatures to form a slurry, heating the other portion of the water, and then adding the slurry to the heated water during continuous stirring, such as by an agitator.

As set forth above, if a gum is used in the gravy, the gum can be present in an amount from about 0.5% to about 3.0% of the gravy, preferably from about 0.6% to about 2.5% of the gravy, and most preferably from about 0.7% to about 2% of the gravy by weight. If a starch is used in the gravy, the starch can be present in an amount from about 2% to about 9% of the gravy, preferably from about 2.5% to about 7% of the gravy, and most preferably from about 3% to about 5% of the gravy by weight.

The meat analog chunks can be mixed with the gravy to form the pseudo-loaf composition. For example, the meat analog chunks can be mixed with the gravy by a mixer using slow agitation. In an embodiment, the additional ingredients, such as the vegetables, the grains, the vegetable oil, the pasta and/or the cheese, if any, can be added to the pseudo-loaf food compositions at this stage. After the meat analog chunks are evenly distributed in the gravy, the resulting pseudo-loaf food composition can have a moisture content from about 60% to about 74% of the composition by weight and preferably from about 67 to about 74% of the composition by weight.

Then the pseudo-loaf food compositions can be set in a container or, alternatively, pre-formed and inserted into a container. The container can then be sealed, steamed, retorted and cooled. The can may be retorted at any suitable temperature for a suitable amount of time. For example, the can may be retorted at 121° C. for about 25 to about 50 minutes. The can may be cooled to any suitable temperature. For example, the can may be cooled to a temperature of 20 to 35° C. In an embodiment, the can is cooled to 22 to 26° C. In a preferred embodiment, the container is a plastic container or metal container such as a can. However, any container can be used to store the pseudo-loaf food composition.

The pseudo-loaf food composition can maintain its shape during and after removal from the container. For example, the pseudo-loaf food composition can be removed from the container by uncovering an opening on the top of the container and flipping the container over so that the opening of the container is on the bottom and closest to a serving apparatus, such as a bowl or a plate, and the pseudo-loaf food composition can maintain its shape during this process. The pseudo-loaf food composition can be easily broken after removal from the container by physically contacting the composition with an object such as a utensil or teeth, but the composition can maintain its shape in the absence of such physical contact.

In an embodiment, the pseudo-loaf food compositions are formulated to provide "complete and balanced" nutrition for an animal, preferably a companion animal, according to standards established by the Association of American Feed Control Officials (AAFCO). In another embodiment, the pseudo-loaf food composition is a pet food composition.

In various embodiments, the animal is a companion animal, preferably a dog or a cat, most preferably a dog. In other embodiments, the animal is a human. When the animal is a human, food grade ingredients should be used, including food grade meats.

As a result, an embodiment of the present invention provides a method for making a pseudo-loaf food composition, the method comprising forming meat analog chunks from a solidified emulsion; and mixing the meat analog chunks with gravy comprising a thickener selected from the group consisting of a gum present in the gravy in an amount from about 0.5 to about 3.0% of the gravy by weight, a starch present in the gravy in an amount from about 2.0 to about 9.0% of the gravy by weight, and combinations thereof, to form the pseudo-loaf food composition; the pseudo-loaf food composition having a moisture content from about 60% to about 74% of the composition by weight and having a loaf-type structure.

The method can comprise emulsifying meat in water to form a first emulsion; performing a second emulsion step in which the first emulsion is thermally gelled by rapid heating to form a second emulsion; and lowering a temperature of the second emulsion to form the solidified emulsion. At least one of flour or dry proteinaceous material can be emulsified with the meat and the water to form the first emulsion. In an embodiment, the pseudo-loaf food composition is positioned in a can that is then sealed, retorted and cooled.

The food composition can be formulated to provide complete and balanced nutrition for an animal, such as a companion animal that can be a dog or a cat.

In another aspect, the invention provides blended food compositions. The blended food compositions comprise one or more of any of the pseudo-loaf food compositions disclosed herein or made using the methods disclosed herein and one or more additional comestible ingredients.

In various embodiments, the comestible ingredients comprise meats, fruits, vegetables, or combinations thereof. In some embodiments, the comestible ingredients comprise extruded food compositions, including kibbles and treats. In other embodiments, the comestible ingredients comprise baked food compositions, including kibbles and treats.

In another aspect, the invention provides a means for communicating information about or instructions for one or more of (1) instructions for feeding the pseudo-loaf food composition or the blended food composition to animals, (2) describing the pseudo-loaf food compositions or blended food compositions to a pet owner, (3) promoting the health or wellness of an animal, (4) combining the pseudo-loaf food composition or the blended food composition with other pet foods, (5) combining the pseudo-loaf food composition or blended food composition with other food sauces, (6) contact information for consumers to use if they have a question about the pseudo-loaf food composition, the blended food composition or their use, or (7) nutritional information about the pseudo-loaf food composition or the blended food composition. Useful instructions can include feeding amounts and frequency. The instructions can be suited for specific types of animals as well (e.g., cats, dogs, or humans). The communication means is useful for instructing on the benefits of using the present invention and communicating the approved methods for feeding the food compositions to an animal.

The means comprises one or more of a physical or electronic document, digital storage media, optical storage media, audio presentation, audiovisual display, or visual display containing the information or instructions. Preferably, the means is selected from the group consisting of a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof.

In another aspect, the present invention provides a package comprising a pseudo-loaf food composition of the present invention and a label affixed to the package containing a an indicia selected from the group consisting of a word, words, a picture, a design, an acronym, a slogan, a phrase, another device, and combinations thereof. The indicia can indicate that the contents of the package contain a pseudo-loaf food composition with beneficial properties such as shelf stability, desirable texture, desirable appearance, and lack of preservatives. Typically, such device can include the words "food compositions for animals" or an equivalent expression printed on the package. Any package or packaging material suitable for containing the composition is useful in the invention, e.g., bag, box, bottle, can, pouch, and the like manufactured from paper, plastic, foil, metal, and the like. In a preferred embodiment, the package contains a food composition adapted for a particular animal such as a human, canine, or feline, as appropriate for the label, preferably a companion animal food composition for dogs or cats. In a preferred embodiment, the package is a retortable can or pouch comprising a pseudo-loaf food composition of the present invention.

EXAMPLES

The invention can be further illustrated by the following examples, although it will be understood that these examples are included merely for purposes of illustration and are not intended to limit the scope of the invention unless otherwise specifically indicated.

Example 1

One hundred (100) lbs of meat analog chunks were produced with ingredients in the proportions shown in Table 1. The frozen meat and meat by-products mixture (65.5 lbs) was emulsified with an emulsion mill during which the temperature of the emulsified mixture was raised to 100° F. This meat emulsion was then blended with the remaining ingredients colors, flavors vitamin and minerals wheat gluten and soy (Table 1) in a mixer and mixed to form a dough. This dough was then pumped through a Siefer Mill (Siefer Machinenfabrik GmbH & Co.) to achieve a discharge temperature of 320° F. and the pressure maintained below 100 psi. The hot dough mixture was then pumped through a heat exchanger, where the product was cooled from 320° F. to just above the boiling point of water. The material exiting the heat exchanger was texturized into slabs of a fibrous, meat analog product of moisture 52.1% by weight. 50 lbs of meat analog slabs were then diced using an Urschel model M dicer and an Urschel Comitrol dicer, to obtain irregularly shaped meat analog chunks of longest sides being less than 5 mm. The other 50 lbs were diced to obtain irregular shaped pieces with longest sides 6-13 mm.

TABLE 1

Meat Analog Chunk 1

| INGREDIENTS | Lbs |
|---|---|
| Frozen Meat & Meat By-Products | 65.5 |
| Wheat Gluten, Vital | 27.0 |
| Titanium Dioxide | 1.0 |
| Soy Protein Concentrate | 1.1 |
| Mineral Premix | 2.5 |
| Flavor | 1.0 |
| Choline Chloride | 0.2 |

TABLE 1-continued

Meat Analog Chunk 1

| INGREDIENTS | Lbs |
| --- | --- |
| Vitamin Premix | 0.1 |
| Taurine | 0.23 |
| Water | 1.37 |
| TOTAL | 100 |

Example 2

One hundred (100) lbs of meat analog chunks were produced with ingredients in the proportions shown in Table 2. The frozen meat and meat by-products mixture (73.3 lbs) was emulsified with an emulsion mill during which the temperature of the emulsified mixture was raised to 100° F. This meat emulsion was then blended with the remaining ingredients colors, flavors vitamin and minerals wheat gluten and soy (Table 2) in a mixer and mixed to form a dough. This dough was then pumped through a Siefer Mill (Siefer Machinenfabrik GmbH & Co.) to achieve a discharge temperature of 215° F. The hot emulsified dough was then pumped through a tube, where it set to form a layered meat analog. As the meat analog exited the tube it was cut into large meat analog chunks of moisture 54.1% by weight. The meat analog chunks were then diced using an Urschel model M dicer and an Urschel Comitrol dicer, to obtain irregularly shaped meat analog chunks of longest sides being less than 10 mm.

TABLE 2

Meat Analog Chunk 2

| INGREDIENTS | Lbs |
| --- | --- |
| Frozen Meat & Meat By-Products | 73.3 |
| Wheat Gluten, Vital | 17.1 |
| Soy Protein Concentrate | 2.5 |
| Soy Flour | 3.7 |
| Tricalcium Phosphate | 0.65 |
| Titanium Dioxide | 0.58 |
| Mineral Premix | 1.3 |
| Flavor | 0.64 |
| Vitamin Premix | 0.07 |
| Taurine | 0.16 |
| TOTAL | 100 |

Example 3

A 100 lbs batch of gum gravy was produced using the formula shown in Table 3. 97.33 lbs water at 77° F. was weighed out into a stainless steel tank. The dry ingredients—xanthan gum, flavor, and salt were added slowly to water with continuous mixing by a portable high speed mixer and mixing stopped when all solids were dissolved.

TABLE 3

Gum Gravy

| INGREDIENTS | Lbs |
| --- | --- |
| Xanthan Gum | 0.8 |
| Flavor | 1.02 |

TABLE 3-continued

Gum Gravy

| INGREDIENTS | Lbs |
| --- | --- |
| Salt, Non Iodized | 0.85 |
| Water | 97.33 |
| TOTAL | 100 |

Example 4

One hundred (100) lbs of starch gravy was produced using the formula shown in Table 4. A slurry was prepared by blending the dry ingredients (starch, flavor, and salt) in 18 lbs of water at ambient (77° F.) temperature. The remaining 75.6 lbs of water was heated to 205° F. The ambient slurry preparation was then added to the heated water with continuous stirring by an agitator forming the gravy. The gravy was stirred for an additional 30 seconds until it thickened.

TABLE 4

Starch Gravy

| INGREDIENTS | Lbs |
| --- | --- |
| Corn Starch Modified with Erythorbic Acid | 4.0 |
| Flavor | 1.0 |
| Salt, Non Iodized | 0.9 |
| Color | 0.5 |
| Water | 93.6 |
| TOTAL | 100 |

Example 5

One hundred (100) lbs of pseudo-loaf was made by combining 51.6 lbs of meat chunk 1 (Example 1, <5 mm) with 46.7 lbs of gum gravy (Example 3) in a mixer with slow agitation and followed with 1.7 lbs of a condiment mix comprising dehydrated cheese, vegetable pieces, spinach flakes, pasta, and grains (Table 5). Moisture was taken when the solids were evenly distributed in the gravy −72.7% by weight (target=67-74%). The mixture was the filled into 85 gm cans and each can hermetically sealed. The sealed cans were then retorted at 121° C. for 50 minutes after which they were cooled to ambient temperature. When the cooled retorted product was emptied from the can, the meat analog chunks were held together with the appearance of a traditional canned loaf product (FIG. 1) without any free gravy or gel. Unlike a loaf which is pasty, chunk-in-gravy with free flowing liquid that can be messy, the pseudo-loaf was friable and easily broken apart and readily consumed by the animal.

TABLE 5

Pseudo-loaf Product with Gum Gravy

| INGREDIENTS | Lbs |
| --- | --- |
| Meat Analog Chunk 1 | 51.60 |
| Pasta/Grains/Dried Vegetables/Dried Cheese Mix | 1.40 |
| Dehydrated Spinach | 0.3 |
| Gum Gravy | 46.7 |
| TOTAL | 100 |

Example 6

Figure 2:
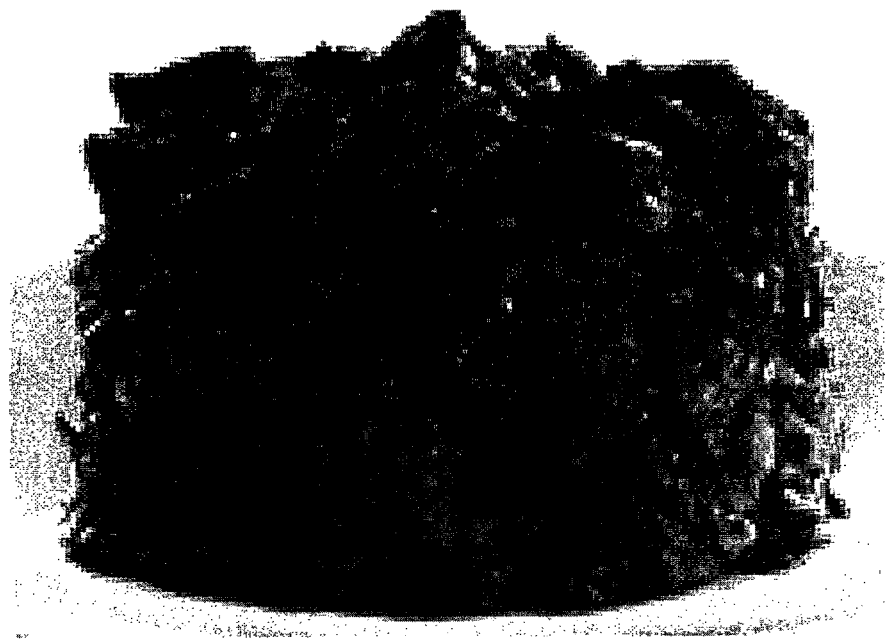
FIG. 2 is a photograph of a pseudo-loaf food composition in a second embodiment.

One hundred (100) lbs of pseudo-loaf was made by combining 53.1 lbs of meat chunk 1 (Example 1, <13 mm) with 46.7 lbs of gum gravy (Example 3) in a mixer with slow agitation and followed with 0.3 lbs dehydrated spinach flakes (Table 6). Moisture was taken when the solids were evenly distributed in the gravy –72.8% by weight (target=67-74%). The mixture was the filled into 85 gm cans and each can hermetically sealed. The sealed cans were then retorted at 121° C. for 50 minutes after which they were cooled to ambient temperature. When the cooled retorted product was emptied from the can, the meat analog chunks were held together with the large meat analog chunk pieces and without any free gravy or gel (FIG. 2). The pseudo-loaf was friable and easily broken apart and readily consumed by the animal.

TABLE 6

Finished Product Using Gum Gravy

| INGREDIENTS | % |
|---|---|
| Meat Analog Chunk 1 | 53.0 |
| Spinach (dried herbs) | 0.3 |
| Gum Gravy | 46.7 |
| TOTAL | 100 |

Example 7

Figure 3:
FIG. 3 is a photograph of a pseudo-loaf food composition in a third embodiment.

One hundred (100) lbs of pseudo-loaf was made by combining 42.5 lbs of meat chunk 1 (Example 1, <5 mm) with 49 lbs of starch gravy (Example 4) in a mixer with slow agitation and followed by carrot, spinach flakes, toasted barley, green peas, rice, and canola oil as shown in Table 7. Moisture was taken when the solids were evenly distributed in the gravy –67.7% by weight (target=67-74%). The mixture was the filled into 85 gm cans and each can hermetically sealed. The sealed cans were then retorted at 121° C. for 50 minutes after which they were cooled to ambient temperature. When the cooled retorted product was emptied from the can, the meat analog chunks were held together with the large meat analog chunk pieces and without any free gravy or gel (FIG. 3). Unlike a loaf which is pasty, chunk-in-gravy with free flowing liquid that can be messy, the pseudo-loaf was friable and easily broken apart and readily consumed by the animal.

TABLE 7

Finished Product Using Starch Gravy

| INGREDIENTS | % |
|---|---|
| Meat Analog Chunk 1 | 42.5 |
| Carrot (dehydrated) | 1.5 |
| Spinach (flakes) | 0.3 |
| Toasted Barley | 1.5 |
| Green Peas (dried) | 1.2 |
| Rice (parboiled) | 1.0 |
| Canola Oil | 3.0 |
| Starch Gravy | 49.0 |
| TOTAL | 100 |

Example 8

Figure 4:
FIG. 4 is a photograph of a pseudo-loaf food composition in a fourth embodiment.

One hundred (100) lbs of pseudo-loaf was made by combining 51.5 lbs of meat chunk 2 (Example 2) with 46.8 lbs of gum gravy (Example 3) in a mixer with slow agitation and followed with 1.4 lbs pasta, and 0.3 lbs of spinach flakes (Table 8). Moisture was taken when the solids were evenly distributed in the gravy –72.2% by weight (target=67-74%). The mixture was the filled into 85 gm cans and each can hermetically sealed. The sealed cans were then retorted at 121° C. for 50 minutes after which they were cooled to ambient temperature. When the cooled retorted product was emptied from the can, the meat analog chunks were held together with the appearance of a traditional canned loaf product (FIG. 4) without any free gravy or gel. Unlike a loaf which is pasty, chunk-in-gravy with free flowing liquid that can be messy, the pseudo-loaf was friable and easily broken apart and readily consumed by the animal.

TABLE 8

Finished Product Using Starch Gravy

| INGREDIENTS | % |
|---|---|
| Meat Analog Chunk 2 | 51.5 |
| Pasta | 1.4 |
| Spinach (dehydrated) | 0.3 |
| Gum Gravy | 46.8 |
| TOTAL | 100 |

Example 9

One hundred (100) lbs of pseudo-loaf was made by combining 54 lbs of meat chunk 1 (Example 1) with 46 lbs of gum gravy (Example 3) in a mixer (Table 9) with slow agitation. Moisture was taken when the solids were evenly distributed in the gravy –72.6% by weight (target=67-74%). The mixture was the filled into 85 gm cans and each can hermetically sealed. The sealed cans were then retorted at 121° C. for 50 minutes after which they were cooled to ambient temperature. When the cooled retorted product was emptied from the can, the meat analog chunks were held together with the appearance of a traditional canned loaf product without any free gravy or gel. The pseudo-loaf was friable and easily broken apart and readily consumed by the animal.

TABLE 9

Finished Product - Meat analog chunks and Gum Gravy Only

| INGREDIENTS | % |
|---|---|
| Meat Analog Chunk 1 | 54 |
| Gum Gravy | 46 |
| TOTAL | 100 |

Example 10

One hundred (100) lbs of pseudo-loaf was made by combining 51 lbs of meat chunk 1 (Example 1) with 49 lbs of starch gravy (Example 4) in a mixer (Table 10) with slow agitation. Moisture was taken when the solids were evenly distributed in the gravy –72.1% by weight (target=67-74%). The mixture was the filled into 85 gm cans and each can hermetically sealed. The sealed cans were then retorted at 121° C. for 50 minutes after which they were cooled to ambient temperature. When the cooled retorted product was emptied from the can, the meat analog chunks were held together with the appearance of a traditional canned loaf product without any free gravy or gel. The pseudo-loaf was friable and easily broken apart and readily consumed by the animal.

TABLE 10

Finished Product - Meat analog chunks and Starch Gravy Only

| INGREDIENTS | % |
|---|---|
| Meat Analog Chunk 1 | 51 |
| Starch Gravy | 49 |
| TOTAL | 100 |

Example 11

One hundred (100) lbs of pseudo-loaf was made by combining 54 lbs of meat chunk 2 (Example 2) with 46 lbs of gum gravy (Example 3) in a mixer (Table 11) with slow agitation. Moisture was taken when the solids were evenly distributed in the gravy –73.6% by weight (target=67-74%). The mixture was the filled into 85 gm cans and each can hermetically sealed. The sealed cans were then retorted at 121° C. for 50 minutes after which they were cooled to ambient temperature. When the cooled retorted product was emptied from the can, the meat analog chunks were held together with the appearance of a traditional canned loaf product without any free gravy or gel. The pseudo-loaf was friable and easily broken apart and readily consumed by the animal.

TABLE 11

Finished Product - Meat analog chunks and Gum Gravy Only

| INGREDIENTS | % |
|---|---|
| Meat Analog Chunk 2 | 54 |
| Gum Gravy | 46 |
| TOTAL | 100 |

Example 12

One hundred (100) lbs of pseudo-loaf was made by combining 51 lbs of meat chunk 2 (Example 2) with 49 lbs of starch gravy (Example 4) in a mixer (Table 12) with slow agitation. Moisture was taken when the solids were evenly distributed in the gravy –73.1% by weight (target=67-74%). The mixture was the filled into 85 gm cans and each can hermetically sealed. The sealed cans were then retorted at 121° C. for 50 minutes after which they were cooled to ambient temperature. When the cooled retorted product was emptied from the can, the meat analog chunks were held together with the appearance of a traditional canned loaf product without any free gravy or gel. The pseudo-loaf was friable and easily broken apart and readily consumed by the animal.

TABLE 12

Finished Product - Meat analog chunks and Starch Gravy Only

| INGREDIENTS | % |
|---|---|
| Meat Analog Chunk 2 | 51 |
| Starch Gravy | 49 |
| TOTAL | 100 |

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims, the invention may be practiced otherwise than as specifically described.

What is claimed is:

1. A method for making a friable pseudo-loaf food composition, the method comprising:
   emulsifying meat and at least one of flour or a dry proteinaceous material selected from the group consisting of wheat gluten, soy protein concentrate, soy protein isolate, egg albumin, nonfat dry milk, and combinations thereof in water to form a first emulsion;
   performing a second emulsion step in which the first emulsion is thermally gelled by rapid heating to form a second emulsion;
   lowering a temperature of the second emulsion to form a solidified emulsion;
   forming meat analog chunks from the solidified emulsion;
   mixing the meat analog chunks with a gravy, the gravy comprising 0.7% to 2% of a gum by weight of the gravy and is selected from the group consisting of gellan gum, xanthan gum, locust bean gum, pectin, kappa carrageenan, iota carrageenan, lambda carrageenan, cellulose gum, gum Arabic, and combinations thereof; and
   positioning the food composition in a can comprising an interior having a shape and then sealing, retorting, cooling and storing the can to impart the shape of the interior of the can on the friable pseudo-loaf food composition;
   wherein the friable pseudo-loaf food composition has a moisture content that is from 67% to 74% of the composition by weight and has a structure that is maintained, during and after removal from the can at ambient temperature and ambient pressure, the friable pseudo-loaf food composition does not have free gravy, and the gravy in the friable pseudo-loaf food composition comprises 46% to 49% by weight of the combined weight of the meat analog chunks and the gravy.

2. The method of claim 1 wherein the flour is selected from the group consisting of wheat flour, amaranth flour, bean flour, white rice flour, brown rice flour, buckwheat flour, chestnut flour, chickpea flour, potato flour, corn flour, nut flour grated from oily nuts, pea flour, peanut flour, rye flour, tapioca flour, soy flour, and combinations thereof.

3. The method of claim 1 wherein the friable pseudo-loaf food composition is formulated to provide complete and balanced nutrition for a dog or a cat.

4. The method of claim 1 wherein the friable pseudo-loaf food composition consists of the meat analog chunks and the gravy.

5. The method of claim 1 wherein the friable pseudo-loaf food composition consists of the meat analog chunks, the gravy, and an ingredient selected from the group consisting of a vegetable, vegetable oil, a pasta, a cheese, and combinations thereof.

* * * * *